R. FLEMING.
REGULATOR FOR DYNAMO ELECTRIC MACHINES.
APPLICATION FILED OCT. 20, 1904.

PATENTED APR. 21, 1908.

Witnesses:
George H. Tilden.
Helen Orford.

Inventor:
Richard Fleming,
by Albert G. Davis
Att'y.

UNITED STATES PATENT OFFICE.

RICHARD FLEMING, OF LYNN, MASSACHUSETTS, ASSIGNOR TO GENERAL ELECTRIC COMPANY, A CORPORATION OF NEW YORK.

REGULATOR FOR DYNAMO-ELECTRIC MACHINES.

No. 885,031.  Specification of Letters Patent.  Patented April 21, 1908.

Application filed October 20, 1904. Serial No. 229,238.

*To all whom it may concern:*

Be it known that I, RICHARD FLEMING, a citizen of the United States, residing at Lynn, in the county of Essex and State of Massachusetts, have invented certain new and useful Improvements in Regulators for Dynamo - Electric Machines, of which the following is a specification.

Among the objects of my invention is the production of a regulator for dynamo-electric machines, which shall be simple in construction and which shall operate to maintain a constant voltage at some point of the system irrespective of the load.

In carrying my invention into practice I provide means whereby a resistance or other controlling device, either in the field circuit of the generator or in the field circuit of the exciter, as the case may be, is, with more or less rapidity, cut into and out of operation in such a manner as to produce the desired regulation.

The novel features which characterize my invention I have pointed out with particularity in the appended claims.

Figure 1:
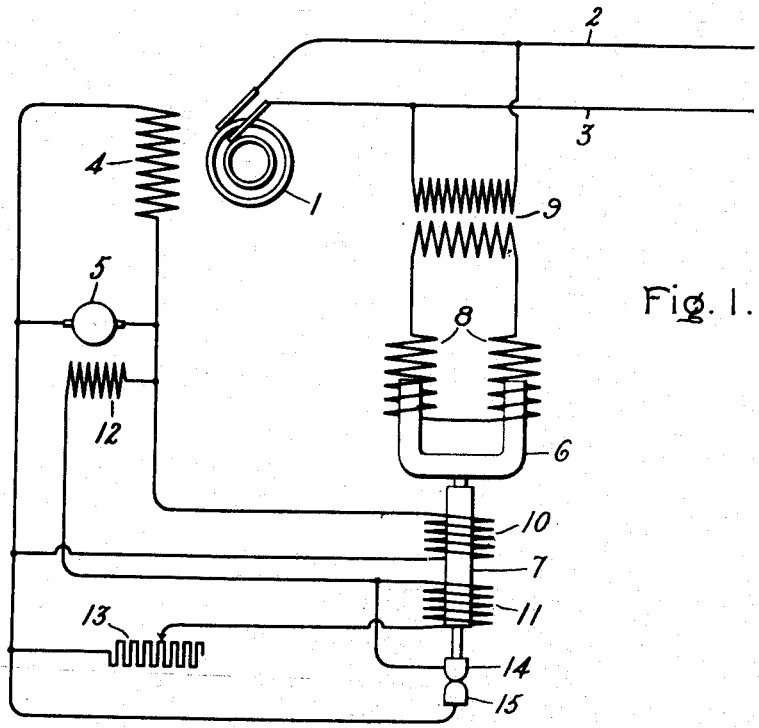
Figure 2:
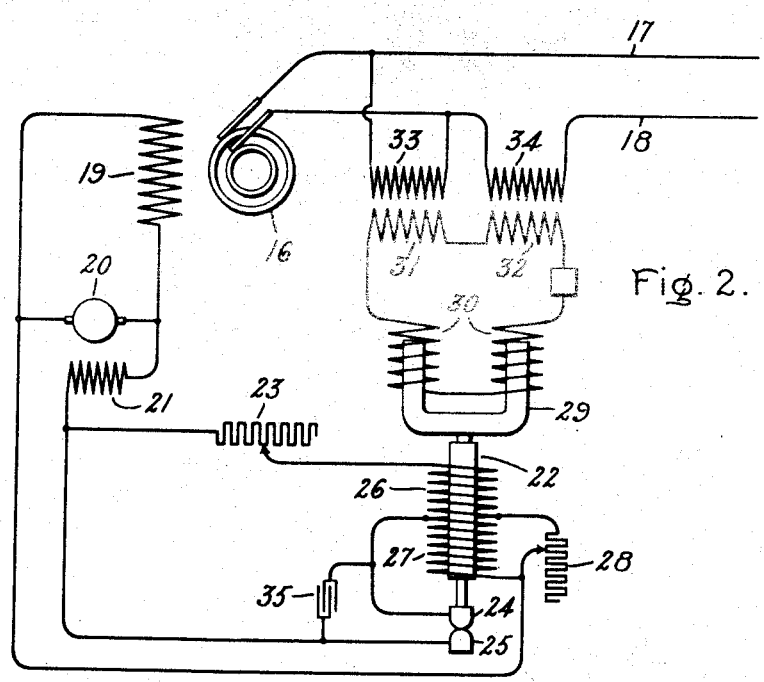

The invention itself, however, will be better understood by reference to the following description taken in connection with the accompanying drawings, in which Figure 1 represents one embodiment of my invention, and Fig. 2 a modification.

In Fig. 1, the regulator is shown as applied to a single-phase alternating-current generator. This machine is indicated conventionally at 1 and is connected to a distribution system by means of leads or conductors 2 and 3. The field winding 4 of the generator is, in the present instance, excited by direct current from a small direct-current exciter, the armature of which is indicated at 5. In order to regulate the voltage of the main generator I control the voltage of the exciter by the following means. This means consists of a regulating device having a vibrating member including two cores 6 and 7 of magnetic material suitably connected together. The core 6, in this case of horseshoe form, is within the influence of solenoids or windings 8 excited by current taken either directly from the mains 2 and 3 or, as in the present instance, from the secondary of the step-down transformer 9.

The other core 7 is provided with two windings 10 and 11 within which it is freely movable. In practice these windings are superposed on or otherwise intermingled with each other, but for convenience are herein shown diagrammatically as arranged side by side. These windings both act to pull down the core 7 in opposition to the windings 8 which tend, by coöperation with the core 6, to move the parts in the opposite direction. The winding 10 is connected directly across the exciter armature 5 and therefore receives the full exciter voltage or at least a current proportional to the voltage. The other winding 11 is connected in series with the exciter field 12 and also in series with an adjustable resistance 13. Two contacts 14 and 15, the first carried by the movable core 7, and the second one fixed, operate when together to short - circuit the coil 11 and the resistance 13. These contacts may be of carbon or other suitable material.

When the apparatus is in operation the magnetic cores vibrate continually and open and close the contacts 14 and 15. As soon as a condition of equilibrium is disturbed, as for example by a heavy load on the main generator whereby the voltage of the generator is reduced, the solenoids 8 weaken and thereby allow the magnetic effect of the coils 10 and 11 to preponderate. The distance of separation of the contacts 14 and 15 is thus decreased and the aggregate time during which the contacts are in engagement in a given period is increased. The resistance 13, being thus out of circuit for a greater portion of the time, allows the voltage of exciter 5 to rise and thus to correct the drop in voltage of the main generator. The resistance 13 is, of course, chosen so large that if permanently in circuit it would reduce the exciter voltage far below the normal voltage and when out of circuit would allow the exciter voltage to rise far higher than normal. Effects intermediate between these are obtained, as will be readily understood, by the continuous vibration of the regulator which cuts the resistance rapidly into and out of circuit at intervals, the lengths of which are automatically adjusted so as to produce the desired compromise between the in-circuit and out-of-circuit effects of the resistance.

As the voltage of the exciter rises, as above described, the coil 10, which is continuously in circuit, increases in strength and holds down the core 7, but is overpowered by the corresponding, though tardy, increase in strength of the solenoids 8 in the generator circuit. A condition of equilibrium is soon reached under the new conditions, and, due to the prompt response of coil 10, without shunting or surging. Instead of providing the core 7 with two separate windings, one across the exciter armature and the other in the field circuit, I may if desired arrange the windings entirely in the field circuit as shown in Fig. 2. In this figure the main generator is indicated at 16, the distribution main at 17 and 18, and the generator field at 19. The exciter armature is shown at 20 and the exciter field at 21. This field is connected in circuit with a winding on the core 22 of the regulating device. This winding consists of two portions in series with each other and with the large adjustable field resistance 23. The contacts 24 and 25, when in engagement, short-circuit the portions 26 of this winding together with the resistance 23 in series therewith. The other portion 27 of the winding may, if desired, have its magnetizing effect adjusted by means of an adjustable shunt resistance 28.

As before, the contact 24 is carried by the core 22 of the regulating device. This core in turn is mechanically connected to the U-shaped core 29 movable within the solenoid 30. These solenoids may be excited by current taken from the secondaries 31 and 32 of two transformers, one of which has its primary winding 33 in shunt to the distribution mains, and the other winding 34 in series with one of these mains. Thereby I obtain a compounding effect for the reason that the windings 31 and 32, being in opposition to each other, cause the current of the solenoid 30 to vary in a proportion greater than the variation of voltage across the mains 17 and 18. This results in obtaining from the regulating mechanism a voltage which rises with increasing load and thus compensates for the drop in voltage on the conductors of the system.

In order to overcome the spark at the contacts of the regulating device I may use condensers, such for example, as at 35, in which case I choose the number of condensers according to the requirements of the particular regulating device.

What I claim as new and desire to secure by Letters Patent of the United States, is,

1. In a regulator for dynamo-electric machines having field and armature circuits, the combination of a vibratory member, a plurality of coils influencing said member, one of said coils being responsive in strength to the voltage to be regulated and another responsive to the voltage in the field circuit of said machine, and contacts controlled by said vibratory member operative to vary the voltage in said field circuit.

2. In a regulator, the combination of a single continuously vibrating member, a coil acting thereon and responsive to the voltage to be regulated, and another coil acting in opposition to the first and short-circuited by the vibration of said member.

3. The combination with a dynamo machine having field and armature circuits, of a vibratory member, and differential coils in operative relation thereto, one of said coils being responsive in strength to the voltage of said dynamo-electric machine, and the other to the field current.

4. In a regulator, the combination of a vibratory member, differential coils operatively related thereto, and an additional coil for said member alternately energized and deënergized through the vibration of said member.

5. The combination of a generator, an exciter therefor, a vibratory device for varying the resistance of the field circuit of said exciter, and coils for operating said vibratory device, one of said coils being excited by current derived from said generator, and another of said coils being excited by current from said exciter.

6. The combination of a generator, an exciter therefor, a vibratory member for varying the resistance in the field circuit of said exciter, and oppositely pulling coils acting upon said vibratory member, one of said coils being excited by current from the generator, and another by current from the exciter.

In witness whereof, I have hereunto set my hand this eighteenth day of October, 1904.

RICHARD FLEMING.

Witnesses:
JOHN A. McMANUS, Jr.,
DUGALD McK. McKILLOP.